Oct. 8, 1968   L. A. MEDLAR ET AL   3,404,962
APPARATUS FOR DETECTING A CONSTITUENT IN A MIXTURE
Filed Oct. 22, 1964
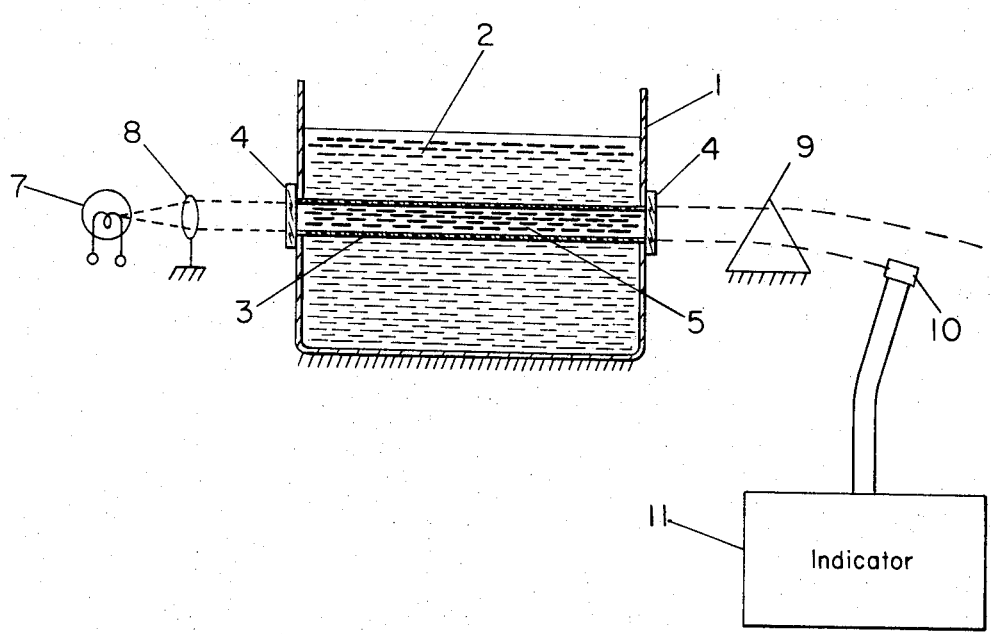
INVENTORS
Lewis A. Medlar
Zoltan Nagy
BY Arthur H. Swanson

# United States Patent Office 3,404,962
Patented Oct. 8, 1968

3,404,962
APPARATUS FOR DETECTING A CONSTITUENT IN A MIXTURE
Lewis A. Medlar, Lansdale, and Zoltan Nagy, Hatboro, Pa., assignors to Honeywell Inc., Minneapolis, Minn., a corporation of Delaware
Filed Oct. 22, 1964, Ser. No. 405,652
6 Claims. (Cl. 23—253)

ABSTRACT OF THE DISCLOSURE

Apparatus including a sealed tube containing an electrolyte which changes in pH in the presence of the constituent to be detected, and containing an indicator which changes in color as the pH of the electrolyte changes. The tube is located in the mixture containing the constituent, and is formed of a membrane which is selectively permeable to the constituent. The changes in the color of the indicator are detected by a photocell which receives a light beam passed through the indicator.

---

This invention relates to constituent analysis apparatus. More specifically, the present invention relates to a device for measuring the concentration of a constituent of a mixture.

An object of the present invention is to provide an improved mixture analyzer for preselected constituents.

Another object of the present invention is to provide an improved apparatus for measuring the concentration of a dissolved gas in a liquid.

Still another object of the present invention is to provide an improved dissolved gas concentration analyzer using a pH measuring technique.

Still another object of the present invention is to provide an improved gas analyzer for measuring dissolved concentration of carbon dioxide.

A further object of the present invention is to provide an improved pH detector for analysis of test solutions.

A still further object of the present invention is to provide a novel dissolved gas analyzer having a simple and rugged structure.

In accomplishing these and other objects, there has been provided a constituent analyzer having a test solution comprising a reactive electrolyte effective to change the pH of the solution in response to a gas introduced therein and a pH indicator mixed in the solution and exhibiting a color shift in response to the change in pH. The test solution is separated from a mixture to be tested by a selectively permeable membrane which is effective to pass the constituent to be analyzed. A light examining means is provided to detect the color shift of the pH indicator by observing the effect of the color shift on the constituents of a light beam passed through the test solution.

A better understanding of the present invention may be had when the following detailed description is read in connection with the accompanying drawing in which the single figure is a pictorial illustration of an embodmeint of the present invention.

Referring to the single figure drawing in more detail, there is shown an embodiment of the invention used as a dissolved gas analyzer having a container 1 for holding a sample of the fluid to be tested 2. The container 1 has extending thereacross a tube 3 of a selectively permeable material suitable for allowing the dissolved gas in the fluid 2 to pass into the interior of the tube 3. For example, in the case of dissolved $CO_2$ in the fluid 2, the tube 3 could be made from Teflon or polyethylene. The tube 3 is sealed at both ends to the container 1 to prevent the fluid 2 from entering the interior of the tube 3. However, a transparent window 4 is provided at both ends of the tube 3 and externally to the container 1 to allow light to pass freely through the tube 3. The windows 4 and tube 3 are arranged to provide a fluid-tight assembly for the interior space of the tube 3.

The interior space of the tube 3 is filled with a suitable electrolyte 5 to react with the constituent gas extracted from the fluid 2 while being separated from the fluid 2 by the tube 3. For example, in the case of dissolved $CO_2$, a suitable electrolyte could be either potassium hydrogen carbonate or sodium hydrogen carbonate. The $CO_2$ gas is effective to react with the indicated electroylte 5 to change the pH of the electrolyte 5. In order to visually detect this change in pH, an indicator is mixed with the electrolyte 5 in the tube 3. For example, in the pH range of 7 to 9, a suitable indicator would be Phenol Red. This indicator is effective to shift its effective color in a range between terminal colors in response to corresponding changes in the pH of the electrolyte and indicator solution. This shift in effective color of the solution is a direct representation of the $CO_2$ concentration in the electrolyte 5 which concentration is in equilibrium with the $CO_2$ content of the sample fluid 2 by the bidirectional operation of the tube 3.

The detection of this color shift may be detected by a specialized spectroscope system comprising a light source 7, a collimating lens means 8, a prism 9 and a light detector 10. The light from the source 7 is arranged to pass through the electrolyte solution 5 by means of the windows 4. The light emerging from the solution 5 is directed through the prism 9 to be separated into its constituent colors. A light sensitive photocell 10 is arranged to sense a portion of the separated color pattern and to provide a signal representative of the intensity of the sensed portion of the separated color pattern and to provide a signal representative of the intensity of the sensed portion of the color pattern. The intensity of the sensed light is affected by the effective color of the solution 5 which provides a color absorbing medium in direct proportion to its effective color. Thus, the shift in color of the solution 5 which shift is a measure of the solution pH and the motivating $CO_2$ concentration is effective to vary the signal output from the photocell 10. The signal from the photocell 10 is connected to an indicator means 11, e.g., a galvanometer type meter, to provide an indication of the $CO_2$ concentration in the fluid sample 2. It is to be noted that the photocell means 10 is arranged to sense the portion of the color pattern which most significantly affected by the color shift in the solution 5. Other modifications of the present invention such as using color filters in the path of the light beam or a monochromatic light source 7 suitable for use with the indicator in the solution 5 may be provided without departing from the scope of the present invention. In addition, it is within the scope of this invention to use the analyzer apparatus to detect other than dissolved gases which varied uses are dependent only on providing a suitable membrane and test solution having visually detectable properties.

What is claimed is:
1. A concentration analyzer comprising a selectively permeable membrane arranged to pass a constituent to be analyzed, a test solution including an electrolyte suitable for reacting with said constituent to change the pH of said solution and a pH indicator exhibiting a color shift in response to a change in the pH of said solution, said membrane being arranged to separate said test solution from an environment containing said constituent, and spectrometer means arranged to pass a beam of light through said solution and to indicate the effect of said color shift of said indicator on said beam of light as a measure of the concentration of said constituent.

2. An analyzer as set forth in claim 1 wherein said test solution is a mixture of potassium hydrogen carbonate and Phenol Red.

3. A gas analyzer comprising a container for fluid having a dissolved gas to be analyzed, a selectively permeable membrane tube arranged to provide a fluid tight passage through said fluid in said container, said tube being pervious to said dissolved gas, a test solution enclosed in said tube and containing an electrolyte exhibiting a pH change in the presence of said gas and a pH indicator exhibiting an effective color shift in response to said pH change, a pair of window means affording a light path through said test solution, a source of light adjacent to one of said window means and operative to send a beam of light through said window means, and a color analyzing means arranged adjacent to the other one of said window means and operative to intercept said light beam emerging from said other one of said window means and to analyze the effect of said color shift of said indicator on said light beam to provide an indication of the gas concentration in said test solution.

4. A gas analyzer as set forth in claim 3 wherein said analyzing means includes a prism arranged to separate said light beam into its component color parts and a photocell means arranged to sense a predetermined portion of said color parts.

5. A gas analyzer as set forth in claim 3 wherein said test solution comprises a mixture of sodium hydrogen carbonate and Phenol Red.

6. A concentration analyzer comprising a selectively permeable membrane arranged to pass a constituent to be analyzed, a test solution including an electrolyte suitable for reacting with said constituent to change the pH of said solution and a pH indicator exhibiting a color shift in response to a change in the pH of said solution, said membrane being arranged to separate said test solution from an environment containing said constituent, and color analyzing means arranged to pass a beam of light through said solution and to indicate the effect of said color shift of said indicator on said beam of light.

References Cited

UNITED STATES PATENTS

| | | |
|---|---|---|
| 2,046,958 | 7/1936 | Marvin. |
| 2,323,876 | 7/1943 | Rickett _____ 210—25 XR |
| 2,797,149 | 6/1957 | Skeggs _____ 23—230 |
| 2,885,922 | 5/1959 | Miller _____ 23—253 XR |
| 2,935,028 | 5/1960 | Ferrari et al. _____ 103—149 |
| 3,068,073 | 12/1962 | Stanford _____ 23—232 |
| 3,109,713 | 11/1963 | Ferrari et al. _____ 23—253 |
| 3,238,020 | 3/1966 | Eiseman _____ 23—253 |

OTHER REFERENCES

Johnsen et al., "Procedure for Determination of Diffusion Coefficients of Gases and Nongaseous Solutes for Membranes," Analytical Chemistry, vol. 27, No. 8, May 1955, pp. 838–840.

MORRIS O. WOLK, *Primary Examiner.*

R. E. SERWIN, *Assistant Examiner.*